(12) United States Patent
Cowelchuk et al.

(10) Patent No.: US 7,690,677 B2
(45) Date of Patent: *Apr. 6, 2010

(54) TRIM PANEL HAVING FOAM BRIDGE SUPPORTED HIDDEN TEAR SEAM

(75) Inventors: Glenn A. Cowelchuk, Chesterfield, MI (US); Michael J. Hier, Milford, MI (US); Todd L. Depue, Brighton, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 766 days.

This patent is subject to a terminal disclaimer.

(21) Appl. No.: 11/425,750

(22) Filed: Jun. 22, 2006

(65) Prior Publication Data
US 2006/0261578 A1  Nov. 23, 2006

Related U.S. Application Data

(63) Continuation-in-part of application No. 10/745,348, filed on Dec. 22, 2003, now Pat. No. 7,121,578.

(51) Int. Cl.
B60R 21/20 (2006.01)
(52) U.S. Cl. .................. 280/728.3; 280/728.1; 280/732
(58) Field of Classification Search .............. 280/728.1, 280/728.3, 731, 732; 269/121.62, 121.69, 269/121.71
See application file for complete search history.

(56) References Cited

U.S. PATENT DOCUMENTS

| | | | |
|---|---|---|---|
| 5,728,342 A | 3/1998 | Wirt et al. | |
| 5,797,619 A | 8/1998 | Bauer et al. | |
| 5,863,062 A | 1/1999 | Harada et al. | |
| 5,961,143 A | 10/1999 | Hlywka et al. | |
| 6,070,901 A | 6/2000 | Hazell et al. | |
| 6,113,131 A | 9/2000 | Uehara et al. | |
| 6,294,124 B1 | 9/2001 | Bauer et al. | |
| 6,337,461 B1* | 1/2002 | Yasuda et al. | .......... 219/121.62 |
| 6,348,172 B1 | 2/2002 | Barnes | |
| 6,457,739 B1 | 10/2002 | Dailey et al. | |
| 6,651,998 B1 | 11/2003 | Mayer et al. | |
| 7,168,731 B2* | 1/2007 | Yasuda et al. | ............ 280/728.3 |
| 2002/0130497 A1 | 9/2002 | Sommer | |
| 2002/0190505 A1 | 12/2002 | Feistel et al. | |
| 2003/0230875 A1 | 12/2003 | Lutze et al. | |
| 2004/0164531 A1* | 8/2004 | Riha et al. | .................. 280/732 |

FOREIGN PATENT DOCUMENTS

| | | |
|---|---|---|
| DE | 41 15 884 A1 | 11/1991 |
| DE | 295 11 172 U1 | 3/1996 |

(Continued)

*Primary Examiner*—Paul N Dickson
*Assistant Examiner*—James English
(74) *Attorney, Agent, or Firm*—Brooks Kushman P.C.

(57) ABSTRACT

In at least one embodiment, the present invention relates to a trim panel for concealing an air bag. The panel comprises a substrate and a cover over the substrate. The cover includes a cover skin. The panel also comprises a tear seam having at least a portion comprising a pattern of alternating residual wall thicknesses in the panel. At least one embodiment of the present invention also relates to a method for making a trim panel for concealing an air bag.

20 Claims, 3 Drawing Sheets

FOREIGN PATENT DOCUMENTS

| | | |
|---|---|---|
| DE | 299 11 205 U1 | 9/1999 |
| DE | 102 31 131 A1 | 2/2004 |
| DE | 102 39 261 B3 | 5/2004 |
| EP | 0 711 627 A2 | 5/1996 |
| JP | 02099324 A1 | 4/1990 |

* cited by examiner

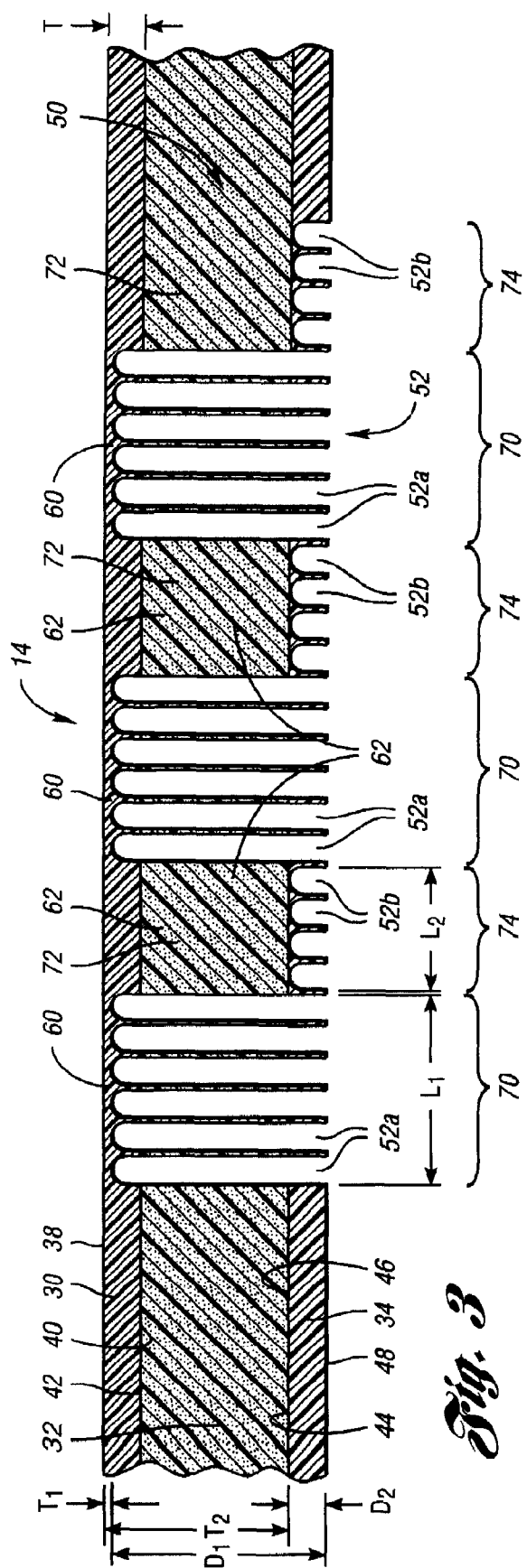
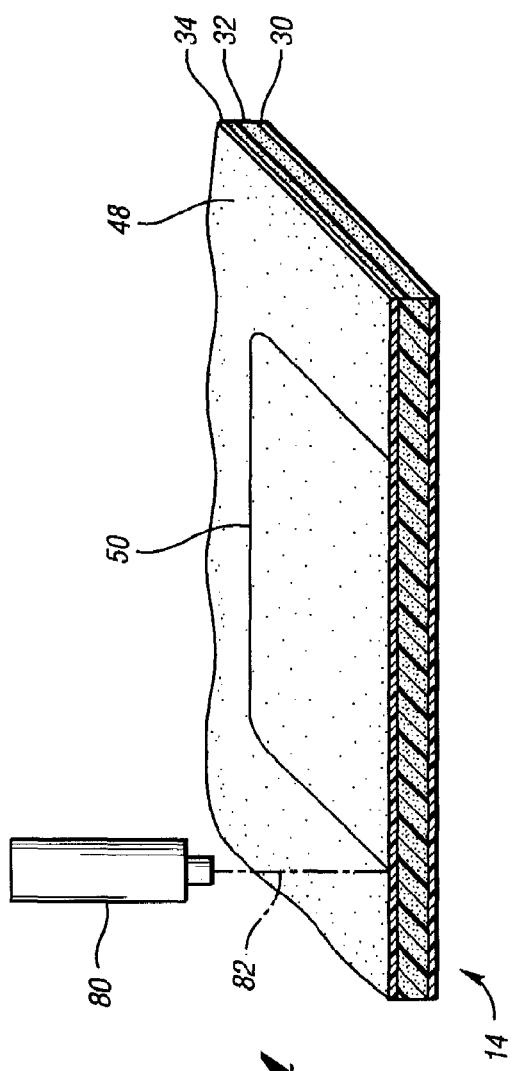
Fig. 3
Fig. 4

TRIM PANEL HAVING FOAM BRIDGE SUPPORTED HIDDEN TEAR SEAM

CROSS-REFERENCE TO RELATED APPLICATIONS

This application is a continuation-in-part of U.S. application Ser. No. 10/745,348, filed Dec. 22, 2003, which is incorporated herein by reference.

BACKGROUND OF THE INVENTION

1. Field of the Invention

The present invention relates to an interior decorative trim panel having a hidden tear seam to cover and hide an air bag in a motor vehicle.

2. Background Art

A typical interior decorative trim panel or cover used to cover and hide the air bag in a motor vehicle comprises a relatively thin elastic plastic skin, a rigid retainer or substrate, and an intermediate layer of soft plastic foam between the skin and the substrate. In some instances, the foam can be omitted.

Air bags are commonly used in motor vehicles, but may also be used in other types of modes of transportation such as trains and airplanes. Specifically, an air bag is stored in a folded condition in a storage receptacle and then rapidly inflates, as with gas from a gas generator or other type of inflator, when an event indicative of a collision of the vehicle is detected by sensors. The air bag then deploys into a position to absorb the impact of the driver or passenger. The interior trim panel that covers the air bag is typically provided with one or more tear seams to provide at least one or more doors for the air bag to deploy through.

It is desirable that any tear seams, and thereby the presence of the air bag, be hidden from the passengers' view for various reasons. It is also desirable that any tear seams be suitable to resist revealing its presence to the passengers over the lifetime of the vehicle and/or in extremely high temperature conditions.

Accordingly, it would be desirable to provide a trim panel having at least one invisible tear seam that can be relatively easily manufactured and will not be appreciably detected by the passengers over the lifetime of the vehicle.

SUMMARY OF THE INVENTION

In at least one embodiment, the present invention relates to a trim panel for concealing an air bag. The panel comprises a substrate, a cover over the substrate, and a tear seam. The tear seam has at least a portion comprising a pattern of alternating residual wall thicknesses in the panel.

In certain embodiments, the present invention relates to a trim panel for concealing an air bag. The panel comprises a substrate, and a cover over the substrate. The panel has a tear seam disposed in front of the air bag comprising a pattern of spaced apart reduced thickness panel portions of a predetermined size.

BRIEF DESCRIPTION OF THE DRAWINGS

FIG. 3 is a view taken along line 3-3 of FIG. 1;

FIG. 4 is a fragmentary sectional view of a trim piece workpiece showing the formation of the hidden tear seam.

DETAILED DESCRIPTION OF THE PREFERRED EMBODIMENT(S)

As required, detailed embodiments of the present invention are disclosed herein. However, it is to be understood that disclosed embodiments are merely exemplary of the invention that may be embodied in various alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention. Moreover, except where otherwise expressly indicated, all numerical quantities in this description and in the claims indicating amounts of materials or conditions of reactions and/or use are to be understood as modified by the word "about" in describing the broadest scope of this invention. Practice within the numeral limit stated is generally preferred. Also, unless expressly stated to the contrary, percent, "parts of", and ratio values are by weight and the description of a group or class of materials as suitable or preferred for a given purpose in connection with the invention implies that mixtures of any two or more members of the group or class may be equally suitable or preferred.

Figure 1:
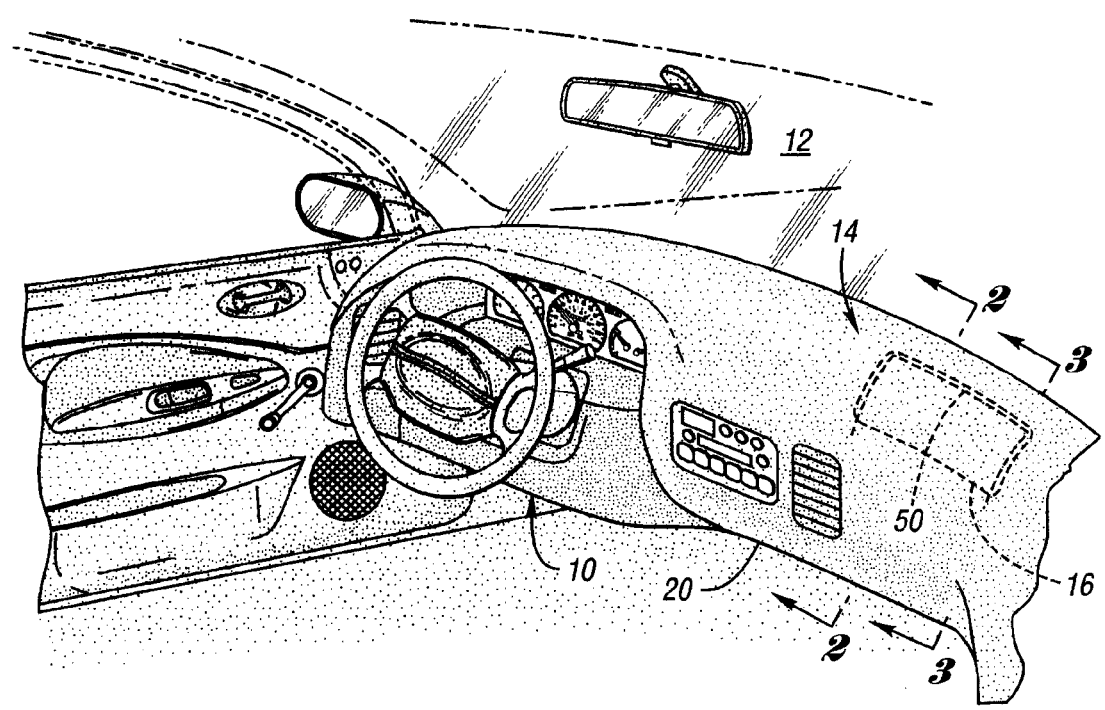
FIG. 1 is a front perspective view of a trim panel which overlies an air bag installation and which has been pre-weakened in a predetermined pattern.
Figure 2:
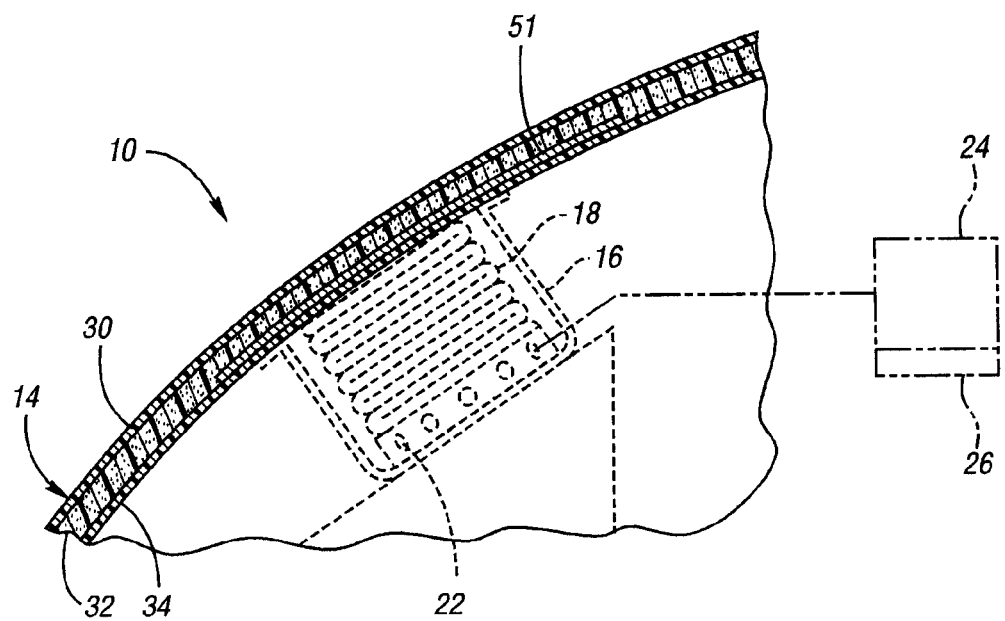
FIG. 2 is a view taken along line 2-2 of FIG. 1.

Referring to FIGS. 1 and 2, there is illustrated a motor vehicle trim panel 10, such as an instrument panel, that is located in front of a windshield 12. A portion of the panel 10, illustrated in this embodiment on the passenger side, forms a cover 14 that normally covers and hides an air bag system 16. The air bag system 16 can be any type of conventional system having an inflatable air bag 18 for protecting a passenger seated in a passenger space 20. While the passenger space 20 is illustrated as being in the front passenger compartment of the vehicle, it should be understood that the passenger space could also be differently located, such as in the driver's side or the rear passenger compartment. For instance, the air bag system 16 could alternatively or additionally be a rear and/or side impact air bag system. Moreover, the air bag system 16 could be a driver's side system. As with other conventional systems, the air bag 18 is inflated by a inflator 22 in response to a signal from a controller 24 indicating an alert indicative of a collision from a sensing device 26, as is well known in the art.

Making reference to FIGS. 2 and 3, the instrument panel 10, including the cover 14, is a laminate structure comprising a thin, soft, elastic plastic shell or skin 30, an intermediate soft foam layer 32, and a relatively rigid retainer or substrate 34, with the latter providing structural support in the panel, as well as means for securing the panel in place on the vehicle body structure. If desired, the foam layer 32 between the skin 30 and the substrate 34 can be omitted.

In at least one embodiment, the skin 30 has an outer surface 38 and a relatively uniform thickness T in the range of 0.25 to 5.0 mm, and in other embodiments of 0.5 to 2.0 mm, at least in the air bag covering area, and may be formed of suitable thermoplastic material, thermosetting material, or other covering materials. Examples of suitable thermoplastic material include, but are not necessarily limited to, vinyl, thermoplastic olefin (TPO), thermoplastic polyurethane (TPU) and polyvinylchloride (PVC). Suitable examples of thermosetting plastic material include, but are not necessarily limited to, spray urethane. Examples of suitable other covering materials include, but are not necessarily limited to, leather and cloth. In at least one particularly preferred embodiment, spray urethane comprises the skin 30.

In at least one embodiment, the substrate 34 may be formed of a suitable thermoplastic material such as polycarbonate (PC), TPO, polypropylene, SMA, acrylonitrile-butadiene-styrene (ABS), wood fiber, and PC/ABS. In certain embodiments, the substrate 34 has a relatively uniform thickness in the range of 1.0 to 8.0 mm, and in other embodiments, 2.0 to 4.0 mm, at least in the air bag covering area.

In at least one embodiment, as is shown in the figures, the foam layer 32 is bonded to the skin 30 and the substrate 34 and may be polyurethane (PU) foam, expanded polypropylene, or any other suitable foam or foam-like-material. In certain embodiments, the foam layer 32 has a relatively uniform thickness in the range of 2.0 to 20.0 mm, and in other embodiments, 4.0 to 10.0 mm, at least in the air bag covering area. All of the above materials may be processed to form the respective panel components in a conventional manner that is well known by those of ordinary skill in the art. Furthermore, other conventional materials not mentioned could also be used as is conventionally known in the art.

As shown in FIG. 3, the skin 30 has the outer surface 38 and a spaced apart inner surface 40. The foam layer 32 has an outer surface 42, adjacent the inner surface 40 of the skin 30, and a spaced apart inner surface 44. The substrate 34 has an outer surface 46, adjacent the inner surface 44 of the foam layer 32, and a spaced apart inner surface 48.

Figure 5:
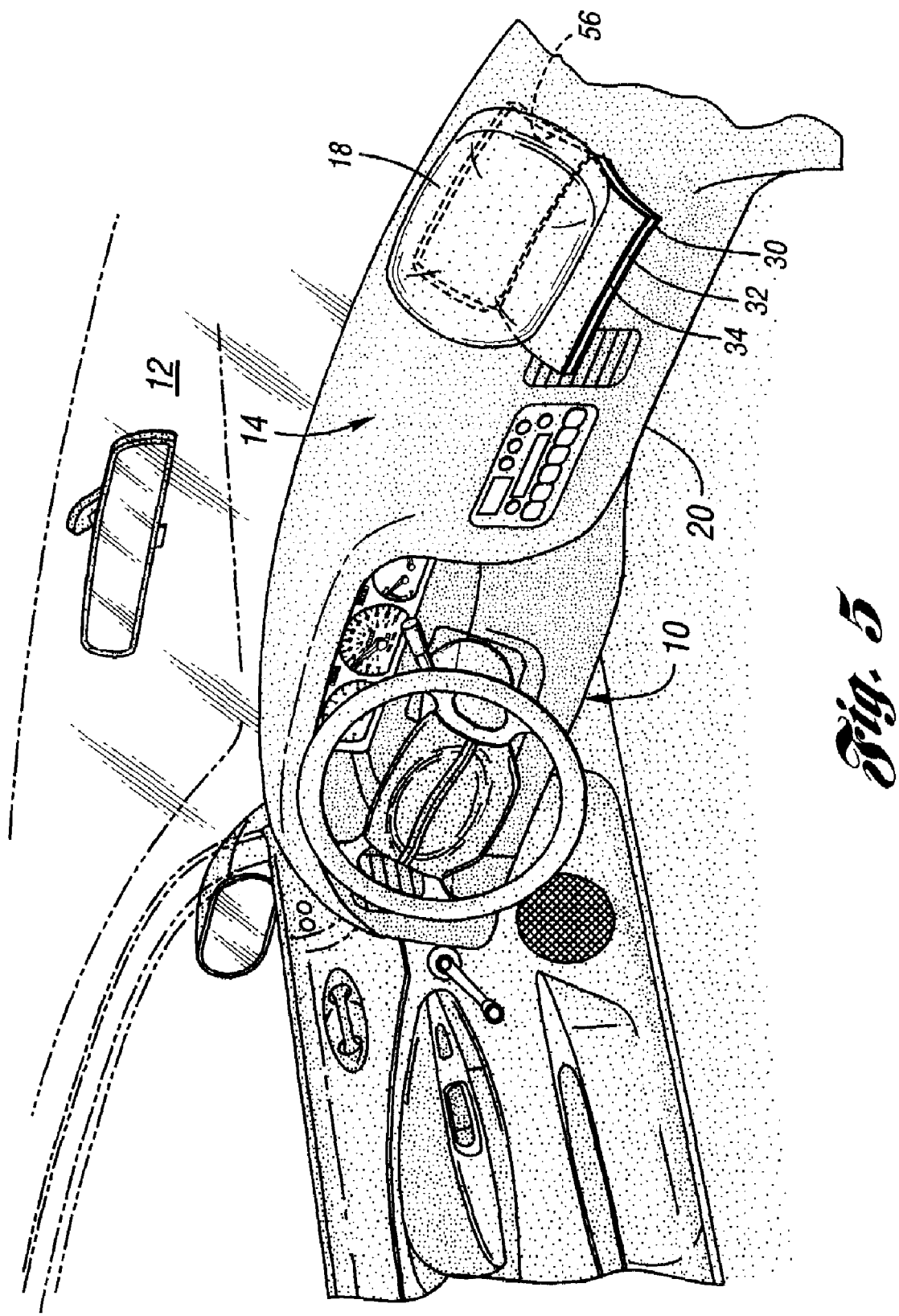
FIG. 5 is a view of the trim panel of FIG. 1 showing the air bag deploying.

In at least one embodiment, as is shown in FIG. 2, the trim panel 10 can also include a metal plate 51 or other like structure, as is known in the art, that is attached to the substrate 34. The metal plate 51 could also be made of another type of material such as a relatively rigid plastic, as is known in the art. In at least one embodiment, the metal plate 51 is attached to the substrate 34, between the substrate 34 and the foam layer 32, by bolts, rivets, or other connectors (not shown), as is known in the art. In certain embodiments, the substrate 34 is arranged to have at least a substantial portion be impacted by the inflating air bag 18 and press outward against the plate 51, the foam layer 32 (if present) and the skin 30 to help tear away portions of the cover 14 (i.e., the foam layer 32 and the skin 30) thereby forming a door, as is illustrated in FIG. 5. The door, or cut apart portion of the panel, 14 swings about a hinge (not shown) to form an opening 56 in the cover for deployment of the air bag 18 into the protective position in the passenger space 20 of the vehicle.

For creating the opening 56 in the air bag cover 14 for deployment of the air bag 18, the air bag cover 14 is provided with a tear seam 50 on the inside thereof that, as will be discussed, will preferably not read through to the outside of the skin 30, but will nevertheless retain desired separation characteristics when the air bag 18 is deployed through the air bag cover 14.

In the embodiment illustrated in the figures, the tear seam 50 is provided to have a C-shape, however, other various configurations or patterns, as is known in the art, may be used. Examples of suitable other types of patterns include, but are not necessarily limited to, H, U or X shapes.

The tear seam 50 has a plurality of first wall portions 60 and a plurality of second wall portions 62. The first wall portions 60 have a first thickness (i.e., depth) $T_1$ and the second wall portions 62 have a second thickness $T_2$, greater than the first thickness. In at least one embodiment, the first thickness $T_1$ (or the first residual wall thickness ($RWT_1$)) is 0.05 to 0.35 mm, as measured from the upper surface 38 of the skin 30, in other embodiments is 0.10 to 0.30 mm, in other embodiments 0.125 to 0.25 mm, and in yet other embodiments is 0.15 to 0.22 mm. In at least one embodiment, the second thickness $T_2$ (the second residual wall thickness ($RWT_2$)) is 2.25 to 25.0 mm, as measured from the upper surface 38 of the skin 30, in other embodiments is 5.0 to 15.0 mm, and in yet other embodiments is 6.0 to 10.0 mm.

In at least one embodiment, as is shown in the figures, the tear seam 50 is formed in the cover 14 to a prescribed tear seam pattern (C-shaped as is shown in the embodiment illustrated) by a plurality of perforations/holes 52. In at least one embodiment, as shown in FIG. 3, the holes 52 comprise alternating sets of a plurality of first holes 52a and a plurality of second holes 52b. The first holes 52a are grouped in spaced apart sets 70. The holes 52a extend from the inner surface 48 of the substrate 34, through the substrate 34, through the foam 32 (if present), and into a portion of the skin 30. In at least one embodiment, the holes 52a have a depth $D_1$ of 2.9 to 32.95 mm, as measured from the inner surface 48 of the substrate 34, in other embodiments 7.5 to 20.0 mm, and in yet other embodiments 10.0 to 15.0 mm. The holes 52a extend into the skin 30 such that the first residual wall thickness ($RWT_1$) of the portion of the skin 30 adjacent (above as shown in FIG. 3) the holes 52a is 5% to 35% of the thickness T of the skin 30, in another embodiment 10% to 30% of the thickness T of the skin 30, in yet another embodiment 12.5% to 25% of the thickness T of the skin 30, and in still yet another embodiment 15% to 22% of the thickness T of the skin 30.

Along the tear seam 50, between adjacent sets 70 of first holes 52a, the holes 52b extend, in at least one embodiment, preferably only, through the substrate 34 such that foam bridges 72 remain at spaced apart locations along the tear seam 50. In certain embodiments, the holes 52b could extend through a portion of the foam layer 32 provided that sufficient foam bridges 72 remain. In certain embodiments, depending upon the thickness of cover skin 30, the holes 52b could extend into skin 30 provided that the seam 50 still comprises alternating wall thicknesses. In at least one embodiment, the holes 52b have a depth $D_2$ of 0 to 30.75 mm, as measured from the inner surface 48 of the substrate 34, in other embodiments 1 to 10.0 mm, and in yet other embodiments 2.5 to 6.0 mm.

In at least one embodiment, as shown in FIG. 3, beneath each of the foam bridges 72 lies a respective set 74 of second holes 52b. In at least one embodiment, the bridges 72 are spaced apart along the tear seam 50, with a respective set 70 of first holes 52a, essentially forming a space, extending between portions of adjacent bridges 72. In certain embodiments, some or all of the structures between adjacent holes 52a, as illustrated in FIG. 3, and for that matter 52b, could be removed/not present, depending upon the manner of manufacturing tear seam 50, such that a continuous space may be present between bridges 72, and/or under bridges 72, as the case may be. The spaced apart bridges 72 configuration allows the tear seam 50 to be relatively easily tearable while also being relatively structurally stable so that the tear seam essentially does not show through the cover 14 even over a relatively long time period, such as the typical lifetime of a vehicle, and with exposure to high heats. As can be readily understood, the first holes 52a help to form the first portions 60 of the tear seam 50 and the holes 52b help to form the second portions 62 of the tear seam 50. In certain embodiments, at least some of the holes 52b may not be present such that the substrate 34 is below at least some of the foam bridges 72.

The tear seam 50 can be formed by a variety of means, as is known in the art. Suitable means include, but are not necessarily limited to, laser scoring, ultrasonic scoring/knifing, stamped routering, and hot stamping. If a non-hole producing device, such as a knife or stamp, is used to form the tear seam 50, the holes 52 would be replaced by one or more essentially continuous score lines or voids, having similar lengths, depths and thicknesses as the sets 70 and 74.

In at least one preferred embodiment for forming the tear seam 50, as is shown in FIG. 4, a laser 80 directs a laser beam 82 at the inner surface of the cover 14 or other trim piece components to score the components along a path defining the desired tear seam pattern. While the present invention will be described as using a laser scoring device 80 to form the tear seam 50, it should be understood that other types of scoring devices, including those set forth above, could be used. In at least one embodiment, the beam 82 is directed at the inner surface 48 of the substrate 34. In at least one embodiment, the laser scoring device 80, suitable for practicing the invention, comprises a carbon dioxide gas laser source producing a coherent infrared laser output beam 82 at a suitable wavelength to effect controlled scoring of a region of the cover 14. Several alternative laser types can achieve acceptable results and laser 80 may be an excimer, solid-state, argon gas, or diode laser.

In at least one embodiment, the cover 14 may be moved relative to the laser 80 to cause tracing of a particular pattern at a precise rate of scoring by a multi-axis positioning system. In this embodiment, the laser beam 82 is focused to a spot or small diameter pencil beam using one or more focusing elements to cause formation of a score line, or hole 52, of acceptable width and depth. The presence of the score line holes 52 which are cut to a significant depth generates the tear seam 50 which is preferably invisible when viewed from the outer surface 38 of cover 14. The outer surface 38 of the cover 14 forms the cosmetic surface presented to the occupant of the vehicle.

The laser 80 is controlled to generate pulses of a laser output beam, each pulse removing a relatively minute quantity of the substrate 34 and/or foam layer 32 and/or skin 30, as the case may be. Depth can be controlled by applying a particular number of pulses before moving to an adjacent site on the inside of the cover 14. Depth can also be controlled by reading the signal via an "A"-side (i.e., surface) sensor. In at least one embodiment, as shown in FIG. 3, a preferred pattern comprises spaced apart sets 70 of six adjacent holes 52a extending through the substrate 34, foam layer 32, and a portion of the skin 30 to leave a first thickness $T_1$ of cover 14 extending from the bottom of the holes 52a to the outer surface 38 of the cover 14.

In the embodiment shown, adjacent the sets 70 of six adjacent holes 52a are the second sets 74 of holes 52b comprising four adjacent holes. The four adjacent holes 52b can extend through the substrate 34 and optionally a portion of the foam layer, but not the entire foam, such that a second thickness $T_2$ of cover 14 is provided between the top of the holes 52b and the outer surface 38 of the cover 14. The second thickness $T_2$ is greater than the first thickness $T_1$ and is sufficient to maintain the presence of the foam bridges 72. These foam bridges 72 provide support along the tear seam 50 to preferably prevent the tear seam 50 from showing through to the exterior of the cover 14.

In at least one embodiment, the pattern forms alternating predetermined wall thicknesses $T_1$ and $T_2$ in the cover 14, presented in part as foam bridges 72, to support the skin 30. This pattern can continue throughout the tear seam 50. The pattern typically comprises alternating thicknesses $T_1$ and $T_2$ of the cover 14 along the tear seam 50 such that a plurality of portions of first thicknesses $T_1$ are separated by adjacent portions of second thicknesses $T_2$ wherein the second thickness is greater than the first thickness. However, certain portions of the tear seam 50 can deviate from the pattern in any suitable manner.

In at least one embodiment, the portion of tear seam 50 along the bottom or downward edge of plate 52 can have a continuous thickness of $T_1$. This portion of the tear seam 50 can have this reduced thickness since the door hinge is in that general area, less panel material should be removed to allow the formation of a hinge rather than allowing the door to separate from the panel. In other embodiments, as is shown, no scoring is needed here.

In certain embodiments, the second thickness $T_2$ comprises the thickness T of the skin 30 and at least a substantial portion of the thickness of the foam layer 32, if not the entire thickness of the foam layer. In a preferred embodiment, each second thickness $T_2$ contains one foam bridge 72. In certain embodiments, the first thickness $T_1$ comprises at least a relatively minor portion, such as less than half, of the thickness T of the skin 30. In certain embodiments, the pattern that forms the first sets 70 of first holes 52a can be anywhere from 1 to 20 adjacent holes, or preferably 3 to 10 holes, and much preferably 4 to 8 holes, and even more preferably 6 holes, whereas the pattern that forms the second sets 74 of second holes 52b can be anywhere from between 1 and 10 holes, more preferably between 3 and 8 holes, and most preferably between 4 and 6 holes.

In certain embodiments, each first set 70 of holes 52a has a length $L_1$ between 0.1 and 100 mm, in other embodiments between 0.5 and 40 mm, in yet other embodiments between 2 and 10 mm, and in still yet other embodiments between 4 and 6 mm. In certain embodiments, each second set 74 of holes 52a has a length $L_2$ of between 1.0 and 200 mm, in other embodiments 2 and 100 mm, in yet other embodiments between 2.5 and 20 mm, and in still yet other embodiments between 3 to 10 mm. However, it should be understood that these lengths can vary in any suitable manner.

In certain embodiments, the wall portions 60 and 62 may have a width, (i.e., the dimension traverse to the length) of 0.05 to 5.0 mm, in other embodiments 0.1 to 1.0 mm, and in yet other embodiments 0.15 to 0.5 mm with the holes 52 having diameters of 0.05 to 5.0 mm, in other embodiments 0.1 to 1.0 mm, and in yet other embodiments 0.15 to 0.5 mm.

The cover 14 of the present invention is made by forming the composite structure comprising the substrate 34, the foam layer 32, and the skin 30 (having thickness T) and then subjecting the cover 14 to pulse scoring in the manner described above.

While embodiments of the invention have been illustrated and described, it is not intended that these embodiments illustrate and describe all possible forms of the invention. For instance, the sets 70 and 74 of holes could be replaced with one or more continuous lines having similar dimensions to the sets. Rather, the words used in the specification are words of description rather than limitation, and it is understood that various changes may be made without departing from the spirit and scope of the invention.

What is claimed is:

1. A trim panel for concealing an air bag, said panel comprising:
    a substrate;
    a cover over the substrate, the cover including a foam layer and a cover skin, the foam layer being between the substrate and the cover skin; and
    a tear seam, the tear seam having at least a portion comprising a pattern of alternating residual wall thicknesses in the panel, wherein the pattern comprises spaced-apart bridges of substantially uninterrupted foam having a length of 0.1 to 100 mm and a width of 0.05 to 5.0 mm to provide support to the cover skin, and wherein the alternating residual wall thickness comprises alternating first and second sets of voids, with the first set of voids having a first depth $D_1$, and the second set of voids having a second depth $D_2$, less than the first depth, with the voids of the first sets of voids extending into the cover skin such that the cover skin adjacent to the first set of voids has a first residual wall thickness ($RWT_1$) of 2.5% to 30% of the thickness T of the remainder of the skin.

2. The panel of claim 1 wherein the pattern provides support to the cover skin and the bridges of foam have a length of 0.5 to 40 mm.

3. The panel of claim 2 wherein the tear seam has a structure which prevents the cover from forming a visually detectable physical weakened portion on the passenger side of the panel.

4. The panel of claim 2 wherein the $RWT_1$ is 5% to 25% of the thickness T of the remainder of the skin.

5. The panel of claim 2 wherein the $RWT_1$ is 10% to 20% of the thickness T of the remainder of the skin.

6. The panel of claim 5 wherein the alternating residual wall thicknesses in the panel comprises a plurality of first wall portions having a first thickness and a plurality of second wall portions having a second thickness, greater than the first thickness, at least a substantial number of each first wall portion being between two adjacent second wall portions.

7. The panel of claim 1 wherein the first thickness $T_1$ comprises 0.01 to 6.0 mm and the second thickness $T_2$ comprises 2.0 to 35.0 mm.

8. The panel of claim 4 wherein a space of 2 to 100.0 mm extends between adjacent foam portions.

9. A trim panel for concealing an air bag, said panel comprising:
   a substrate; and
   a cover over the substrate, the cover including a foam layer and a cover skin, the foam layer being between the substrate and the cover skin; and
   a tear seam, the tear seam having at least a portion comprising a pattern of alternating residual wall thicknesses in the panel, wherein the pattern comprises spaced-apart bridges of substantially uninterrupted foam having a length of 2 to 100 mm and a width of 0.05 to 5.0 mm to provide support to the cover skin, and wherein the alternating residual wall thickness comprises alternating first and second sets of holes, with the first set of holes having a first depth $D_1$, and the second set of holes having a second depth $D_2$, less than the first depth, with the holes of the first sets of holes extending into the cover skin such that the tear seam has a structure which prevents the cover from forming a visually detectable physical weakened portion on the passenger side of the panel.

10. The panel of claim 9 wherein the cover skin adjacent to the first set of holes has a residual wall thickness of 2.5% to 30% of the thickness T of the remainder of the skin.

11. The panel of claim 9 wherein the cover skin has a residual wall thickness that is less than half of the thickness T of the remainder of the skin.

12. A method of forming a trim panel for concealing an air bag, said method comprising:
   providing a panel comprising a substrate and a cover over the substrate, the cover including a foam layer and a cover skin, the foam layer being between the substrate and the cover skin, and the cover skin having a thickness T; and
   forming a tear seam in the panel having at least a majority portion comprising a pattern of alternating residual wall thicknesses in the panel, wherein the pattern comprises spaced-apart bridges of substantially uninterrupted foam having a length of 0.1 to 100 mm and a width of 0.05 to 5.0 mm to provide support to the cover skin, and wherein the alternating residual wall thickness comprises alternating first and second sets of voids, with the first set of voids having a first depth $D_1$, and the second set of voids having a second depth $D_2$, less than the first depth, with the voids of the first sets of voids extending into the cover skin such that the cover skin adjacent to the first set of voids has a residual wall thickness (RWT) of 2.5% to 30% of the thickness T of the remainder of the skin.

13. The method of claim 12 comprises employing a laser to form the pattern of alternating residual wall thicknesses in the panel.

14. The method of claim 12 wherein the pattern comprises spaced-apart bridges of material which provide support to the cover skin and a foam layer is provided between the substrate and the cover skin, with the bridges comprising foam portions below the cover skin.

15. The method of claim 14 wherein a space of 0.1-100.0 mm extends between each foam portion and the portions of the cover over the spaces have a depth of 0.01-6.0 mm.

16. The method of claim 15 wherein the alternating residual wall thicknesses in the panel comprises a plurality of first wall portions having a first thickness and a plurality of second wall portions having a second thickness, greater than the first thickness, at least a substantial number of each first wall portion being between two adjacent second wall portions.

17. The method of claim 13 wherein the voids comprise holes.

18. The panel of claim 3 wherein the second set of voids have a length $L_2$ that is between 1.0 and 200 mm.

19. The panel of claim 1 wherein the second set of voids have a length $L_2$ that is between 1.0 and 200 mm.

20. The panel of claim 1 wherein the foam bridges have a length that is between 2 and 100 mm and the first set of voids have a length that is between 2 and 10 mm.

* * * * *